US005908650A

United States Patent [19]
Lenoble et al.

[11] Patent Number: 5,908,650
[45] Date of Patent: *Jun. 1, 1999

[54] PIGMENT COMPOSITION CONTAINING ANTHOCYANINS STABILIZED BY PLANT EXTRACTS

[75] Inventors: Rod Lenoble; Steven L. Richheimer, both of Westminster; Virginia R. Bank; David T. Bailey, both of Boulder, all of Colo.

[73] Assignee: Hauser, Inc., Boulder, Colo.

[*] Notice: This patent issued on a continued prosecution application filed under 37 CFR 1.53(d), and is subject to the twenty year patent term provisions of 35 U.S.C. 154(a)(2).

[21] Appl. No.: 08/546,502

[22] Filed: Oct. 20, 1995

[51] Int. Cl.$^6$ ....................................................... A23L 1/27
[52] U.S. Cl. ......................... 426/262; 426/268; 426/270; 426/540
[58] Field of Search .................................. 426/262, 250, 426/268, 270, 54, 269

[56] References Cited

U.S. PATENT DOCUMENTS

| | | | |
|---|---|---|---|
| 4,172,902 | 10/1979 | Asen et al. | 426/250 |
| 4,285,982 | 8/1981 | Iacobucci et al. | 426/250 |
| 4,481,226 | 11/1984 | Crosby et al. | 426/540 |
| 4,500,556 | 2/1985 | Langston | 426/540 |
| 4,775,477 | 10/1988 | Stahl et al. | 210/641 |
| 5,318,788 | 6/1994 | Yokota et al. | 426/268 |
| 5,382,714 | 1/1995 | Khachik | 568/834 |

OTHER PUBLICATIONS

Adachi et al., Patent Abstracts of Japan, Abstracting 58–43759, Mar. 1983.
Adachi et al., Patent Abstracts of Japan, Abstracting 56–151478, Nov. 1981.
Teubner, C., Herbs & Spices, 1993, p. 49, Penquin Books, New York.
Bown, D., Encyclopedia of Herbs and their Uses, 1995, p. 343, Dorling Kindersley.
114: 100161, Washino et al., Abstracting JP 02214780 A2 Aug.1990.
92: 20829, Ikawa, Abstracting Aichi–ken Shokuhin Kogyo Shikensho Nempo, 19,15–25, 1978.
114:225966 Nishimura et al., Abstracting JP 02110164 A2 Apr. 1990.
E. Miniati and R. Coli, "Anthocyanins: Not Only Color For Foods," the First International Symposium on Natural Colorants (Nov. 1993) FID/CON Labs, Trimester Int'l, S.I.C. Pub'g, Hamden, CT.
F. Francis, "Potential for Highly Acylated B–Ring Substituted Anthocyanins as Food Colorants", the First International Symposium on Natural Colorants (Nov. 1993) FID/CON Labs, Trimester Int'l, S.I.C. Pub'g, Hamden, Ct.
G. Mazza and L. Gao, "Acylated Anthocyanins in Purple Hulls of Sunflower Seeds and Purple–Fleshed Potatoes", the First International Symposium on Natural Colorants (Nov. 1993) FID/CON Labs, Trimester Int'l, S.I.C. Pub'g, Hamden, CT.

R. Williams and A. Shrikhande, "New Generation of High–Colored Grape Juice Concentrate", the First International Symposium on Natural Colorants (Nov. 1993) FID/CON Labs, Trimester Int'l, S.I.C. Pub'g, Hamden, CT.
A. Baublis, et al., "Stability of Anthocyanins from in Vivo and In Vitro Sources", the First International Symposium on Natural Colorants (Nov. 1993) FID/CON Labs, Trimester Int'l, S.I.C. Pub'g, Hamden, CT.
D. Madhavi, et al., "Anthocyanins from Cell Cultures of Cranberry", the First International Symposium on Natural Colorants (Nov. 1993) FID/CON Labs, Trimester Int'l, S.I.C. Pub'g, Hamden, CT.
K. Sato, et al., "Anthocyanin Production from Cell Cultures of Strawberry", the First International Symposium on Natural Colorants (Nov. 1993) FID/CON Labs, Trimester Int'l, S.I.C. Pub'g, Hamden, CT.
O. Inami, et al., "Stability of Anthocyanins from Elderberries", The First International Symposium on Natural Colorants (Nov. 1993) FID/CON Labs, Trimester Int'l, S.I.C. Pub'g, Hamden, CT.
K. Onishi, "Natural Red Color Derived from Red Cabbage", the First International Symposium on Natural Colorants (Nov. 1993) FID/CON Labs, Trimester Int'l, S.I.C. Pub'g, Hamden, CT.
O. Dangles, "Quantitative Description of Pelargonidin Chromophore–Cinnamic Acid Residues Interactions Within the Pharbitis Anthocyanin Family", the First International Symposium on Natural Colorants (Nov. 1993) FID/CON Labs, Trimester Int'l, S.I.C. Pub'g, Hamden, CT.
J. B. Harborne, *The Flavonoids: Advances in Research Since 1986*, pp. 343–359, Chapman & Hall, London (1988).
S. Asen and R.M. Horowitz, "Apigenin 4'o–β–D–Glucoside 7–o–β–D–Glucuronide: The Copigment in the Blue Pigment of *Centaurea Cyanus*," *Phytochemistry*, 13:1219–1223 (19174).
A. Asen, et al., "Effect of pH and Concentration on the Anthocyanin–Flavonol Co–Pigment Complex on the Color of 'Better Times' Roses," *J. Amer. Soc. Hort. Sci.*, 96(6):770–773 (1971).
R. Brouillard and A. Cheminat, "Flavonoids and Plant Color," Plant Flavonoids in Biology and Medicine II: Biochemical, Cellular, and Medicinal Properties, pp. 93–106 (1988), Alan R. Liss, Inc.
C. Timberlake and B. Henry, "Anthocyanins as Natural Food Colorants," Plant Flavonoids in Biology and Medicine II: Biochemical, Cellular, and Medicinal Properties, pp. 107–121 (1988), Alan R. Liss, Inc.

(List continued on next page.)

*Primary Examiner*—Leslie Wong
*Attorney, Agent, or Firm*—Chrisman, Bynum & Johnson; Steven C. Petersen

[57] ABSTRACT

An improved pigment composition containing an anthocyanin pigment and a pigment-improving agent selected from the group consisting of flavonoid glycuronides, flavonoid glucuronides, and caffeic acid derivatives. The pigment-improving agents deepen and improve the intensity of the anthocyanin pigment and increase its stability in the presence of light, heat and/or pH.

26 Claims, No Drawings

OTHER PUBLICATIONS

N. Okamura, et al., "Flavonoids in *Rosmarinus Officinalis* Leaves," *Phyochemistry*, 37(5):1463–1466 (1994).

M. Kearsley and N. Rodriguez, "The Stability and Use of Natural Colours in Foods: Anthocyanin, β–carotene and Riboflavin," *J. Fd. Technol.*, 16:421–431 (1981).

K. Yoshida, et al., "Stabilization and Color Variation of Anthocyanins with Inorganic Salts," *Seventh Symposium on Salt*, vol. II, pp. 623–630 (1993), Elsevier Science Publishers, Amsterdam.

S. Asen, et al., "Copigmentation of Aurone and Flavone from Petals of *Antirrhinum Majus*," *Phytochemistry*, 11: 2739–2741 (1972).

H. Tamura and A. Yamagami, "Antioxidative Activity of Monoacylated Anthocyanins Isolated from Muscat Bailey A Grape," *J. Agric. Food Chem.*, 42:1612–1615 (1994).

S. Asen, et al., "Co–Pigmentation of Anthocyanins in Plant Tissues and its Effect on Color," *Phytochemistry*, 10:1139–1144 (1971).

S. Asen, et al., "Anthocyanin, Flavonol Copigments, and pH Responsible for Larkspur Flower Color," *Phytochemistry*, 14:2677–2682 (1975).

S. Asen, et al., "Co–Pigmentation Effect of Quercetin Glyosides on Absorption Characteristics of Cyanidin Glycosides and Color of Red Wing Azalea," *Phytochemistry*, 10:171–175 (1971).

Jurd, L., "The Formation of Metal and 'Co–Pigment' Complexes of Cyanidin 3–Glucoside," *Phytochemistry*, 5:1263–1271 (1966).

Harborne, J.B., The Flavonoids: Advances in Research Since 1986, pp. 576–588, Chapman & Hall, London (1988).

Bobbio, F. O., et al., "Effect of Different Copigments on the Stability of Anthocyanins," pp. 29–32.

Mistry T. V., et al., "Polyphenol Interactions. Part 5. Anthocyanin Co–pigmentation," *J. Chem. Soc. Perkin Trans*, 2: 1287–1296 (1991).

Mazza, G., "Recent Developments in the Stabilization of Anthocyanins in Food Products," *Food Chemistry*, 25:207–225 (1987).

L. Weinstein, "Senescence of Roses. I. Chemical Changes Associated with Senescence of Cut Better Times Roses," *Contributions from Boyce Thompson Institute*, 19:33–48 (1957), Boyce Thompson Institute for Plant Research, Inc.

5,908,650

PIGMENT COMPOSITION CONTAINING ANTHOCYANINS STABILIZED BY PLANT EXTRACTS

BACKGROUND OF THE INVENTION

This invention relates generally to the field of improving the pigmentation and stability of anthocyanin-containing foods and beverages using compounds easily obtainable from naturally-occurring plant materials.

An attractive and stable color is important to the marketability of foods and beverages. Synthetic coloring agents have commonly been used in the food and beverage industry. The safety of synthetic coloring agents, however, has been questioned. For example, the Food and Drug Administration has delisted red dyes No. 2 and No. 4. In general, consumer confidence in synthetic food materials has waned. Thus, the need exists for naturally-occurring pigments.

Anthocyanins are found in many naturally occurring foods and can serve as pigments to impart a wide range of colors. Anthocyanin pigments are biodegradable and water soluble; they are not suspected toxins or carcinogens. In fact, Miniati and Coli have reported that ingested anthocyanins can lower cholesterol, inhibit platelet aggregation, and exhibit anti-thrombotic and antioxidant properties. (Miniati, E. and Coli, R., "Anthocyanins: Not only Color for Foods," *The First International Symposium on Natural Colorants*, Francis, Dr. F. J., Ed. (1993) available through the Herald Organization, Hamden, Conn.)

Despite those beneficial attributes, anthocyanin pigments have not been widely used as food additives for several reasons. Anthocyanins are difficult to purify which makes obtaining commercially useful quantities difficult. (Mazza, G. and Brouillard, R. "Recent Developments in the Stabilization of Anthocyanins in Food Products," *Food Chemistry*, Vol. XXV, pp. 207–225 (1987)). The color of anthocyanin preparations has been reported to be two orders of magnitude weaker than that of synthetic compounds. (Ibid.) Anthocyanins in aqueous solution are degraded by heat, light, enzymes, nucleophiles, oxygen and ascorbic acid.

Acylated anthocyanins have been discovered that retain color over a broader pH range. See, e.g, U.S. Pat. No. 4,172,902. However, source materials for acylated anthocyanins are limited as are the colors which acylated anthocyanins impart. Purified acylated anthocyanins have not been approved as food additives. Thus, it is problematic to improve the color of food products by simple addition of acylated anthocyanins at the present time.

It is highly desirable to improve the performance of anthocyanin pigments as additives for food products. As used herein, the term "food product" includes both solid edible substances and liquid beverages. The term food "additive" refers to a material that is applied to or inserted into a food product. It is particularly useful to find pigment-improving agents that protect, i.e., "stabilize," anthocyanins from color loss due to pH, heat, and/or light. Preferably, the pigment-improving agents are, like the anthocyanins, naturally occurring, biodegradable and water soluble and have no known toxic or carcinogenic effects.

The use of certain compounds, particularly flavonols, to improve the stability of anthocyanin pigments in foods has previously been suggested. See, U.S. Pat. No. 4,285,982, which also recognizes that the use of many naturally-occurring flavonols for this purpose is not "attractive," because of their limited availability and poor water solubility. Indeed, U.S. Pat. No. 4,285,982 teaches the use of certain compounds which are derived by synthetic means. These synthethic materials must be subjected to expensive and time-consuming tests to demonstrate compliance with rigorous regulatory requirements before commercial application. Even then they will always have diminished marketability due to their stigma as non-natural food additives.

It has long been known that flavonoids are often associated with anthocyanins in plants. Certain flavonoids have been shown in vitro to cause both a bathochromic and hyperchromic shift in the absorption spectrum of anthocyanins. The "bathochromic shift" refers to an increase in the wavelength at which the absorbance is greatest, the $\lambda_{max}$. The "hyperchromic shift" refers to an increase in absorbance at $\lambda_{max}$. The shift in $\lambda_{max}$ and increase in absorbance is called "copigmentation." Copigmentation results in a color shift toward a longer wavelength and a more intense color than that seen with the anthocyanin alone. Copigmentation of anthocyanins with plant flavonoids is believed responsible for the wide range of color shades found in flowers.

Asen et al. have identified several naturally-occurring copigments, including flavonoids. (S. Asen, R. N. Stewart and K. H. Norris; "Copigmentation of Anthocyanins in Plant Tissues and its Effect on Color," *Phytochemistry*, 11, 1139 (1972)). Asen et al. measured and reported the copigmentation potency of many of these compounds, as shown by their hyperchromic and bathochromic shifts. The most potent of these copigments have limited availability and water solubility. They are not good candidates as pigment-improving agents for anthocyanin food additives.

Asen et al., were interested in identifying and modifying the color of flowers. In that endeavor they isolated two flavonoid glucuronides from two different flower types, "Blueboy" cornflowers and "Better Times" roses, respectively. Asen and Horowitz attributed the color of Blueboy cornflowers to copigmentation of anthocyanins with apigenin 4'-O-beta-D-glucoside 7-O-beta-D-glucuronide. (Asen, S. and Horowitz, R. M., *Phytochemistry*, Vol. 13, pp. 1219–1223 (1974)). Asen et al. extracted several flavonol glucosides and quercetin 3-glucuronide from Better Times roses and identified these flavonols as anthocyanin copigments responsible for the color of that rose. (Asen et al., *J. Amer. Soc. Hort. Sci.*, 96 (6): 770–773 (1971)).

Neither Asen reference, however, recognizes the effect of these glucuronides on anthocyanin stability, their potency, or their availability. Indeed, the art does not show or suggest that those glucuronides or any other derivatives of glycuronic acid would have commercial value as pigment-improving agents for anthocyanin-containing products, especially foods. As used herein "pigment-improving agent" refers to a compound which is both a copigment and stabilizer of anthocyanin-based color. References to "improving" pigmentation mean to concomitant copigmentation and stabilization of anthocyanin-based colors.

SUMMARY OF THE INVENTION

We have now discovered that pigment-improving agents may be obtained from water-soluble and easily-obtainable plant extracts. Such agents are capable of stabilizing and enhancing anthocyanins in foods and food color additives. As used herein, the term "stabilizing" means capable of reducing the rate of loss of anthocyanin color due to pH, heat and/or light. The pigment-improving agents of the invention also increase/deepen the hue and increase the intensity of the color demonstrated by the anthocyanin pigment, thereby decreasing the amount of anthocyanin that must be used with a food product to deliver the same amount of color. The pigment-improving agents useful in the present invention are naturally occurring, biodegradable and have no known toxic or carcinogenic effects. They are plant extracts and compounds obtained relatively easily, inexpensively, and in commercially-viable quantities from natural materials.

The pigment-improving agents useful in the present invention include certain flavonoid glycosides including, but not limited to, flavonoid glycuronides and luteolin glycosides.

The term "flavonoid glycosides" as used herein means a flavonoid having a sugar moiety attached. The term "flavonoid glycuronides" means those flavonoid glycosides to which attached is a sugar moiety containing a carboxylic acid. Nonlimiting examples of flavonoid glycuronides include flavonoid glucuronides and galacturonides. As used herein, "flavonoid glucuronides" means flavonoids to which glucuronic acid, i.e. glucose having a carboxylic acid at C6, is attached.

The present invention provides food compositions having anthocyanin pigment additives and an effective amount of a pigment-improving agent, wherein the pigment-improving agent comprises a compound selected from the group consisting of flavonoid glycosides, including but not limited to luteolin glycosides and flavonoid glycuronides. A caffeic acid derivative, rosmarinic acid, is also a pigment-improving agent useful in the present invention. The present invention also includes methods for improving anthocyanin pigment additives using the active agents mentioned above. For example, the present invention includes the method of increasing the intensity or hue of an anthocyanin pigment comprising applying an effective amount of a pigment-improving agent comprising a flavonoid glycoside.

The pigment-improving agents of the present invention are different from and superior to previously reported attempts at improving anthocyanin pigmentation.

As mentioned previously, the method of the present invention is superior to the use of purified acylated anthocyanin pigments, which are neither available from economically viable sources nor approved for use as food additives. In contrast, the active ingredients of the present invention can be easily and inexpensively obtained in commercial quantities from readily-available plant materials which are generally recognized as safe ("GRAS") food substances as defined by 21 CFR Ch. 1, Part 182. GRAS food substances do not require governmental approval for use in foods in the United States.

For example, we have shown that a water-soluble extract from the common spice rosemary (*Rosmarinus officinalis* L.) is rich in compounds which stabilize and enhance anthocyanin-based color. The active water soluble compounds can be extracted from whole rosemary, deoiled rosemary, or rosemary that has previously been extracted with organic solvents to remove valuable oil-soluble antioxidant compounds such as carnosic acid. Either water or an alcohol, such as methanol or ethanol, or combinations of water and an alcohol can be used to extract water-soluble compounds from rosemary. The extraction can be performed on either whole rosemary needles or on cracked or powdered biomass. The resulting crude extract can be further purified to remove inactive compounds, thereby increasing the potency of the solids 2 to 20-fold. Consequently, both crude and partially purified extracts which contain water-soluble constituents of rosemary enhance and/or increase the stability of anthocyanin-based color in aqueous solution.

This effect has not been previously recognized. While Okamura et al. showed that rosemary leaves contain certain flavonoid glucuronides which possess antioxidant activity, none of those compounds were identified as pigment-improving agents for anthocyanin food additives. (Okamura et al., *Phytochemistry*, Vol. 37, No. 5, pp. 1463–1466 (1994)).

Moreover, antioxidants are not generally expected to enhance anthocyanin color or to protect anthocyanin color loss caused by heat or light. In fact, another antioxidant, ascorbic acid, increases the rate of loss of anthocyanin color. The art does not show or suggest that materials generally known as antioxidants have commercial value as pigment-improving agents.

Other plant sources having the above-mentioned advantages include, but are not limited to, other members of the Labiatae family such as sage, basil, marjoram, oregano, thyme and mint. In fact, plant sources useful in the present invention include any food and GRAS material which contains appreciable amounts of flavonoid glycuronides, flavonoid glycosides or caffeic acid derivatives, such as, rosmarinic acid. As discussed above, such substances are particularly important because such substances do not require FDA approval for use in foods.

The pigment-improving agents of the present invention are also different from and superior to prior art methods using exogenous compounds to improve anthocyanin pigmentation. For example, Yoshida et al. reported that high concentrations of inorganic salts can stabilize the color of a shisonin solution, presumably by complexation of metal ions with the pigment. (Yoshida et al., *Seventh Symposium on Salt*, Vol. II, pp. 623–630 (1993)). High salt concentrations may impart an undesirable taste or otherwise be undesirable in many food products. The use of inorganic salts as color stabilizers is further limited because only a few anthocyanins form complexes with metal ions. These limitations do not apply to the agents of the present invention.

U.S. Pat. No. 4,481,226 to Crosby et al. reported that tannic acid stabilizes the anthocyanin-based color of grape pomace extract. Tannic acid is not included within or similar to the pigment-improving agents of the present invention. Large amounts of tannic acid are required, i.e., at least 5–25% of the combined weight of tannic-acid-treated colorant. In contrast, the pigment-improving agents of the present invention can be used in amounts of 0.1% or less and preferably between 100–500 ppm. Crosby et al. do not suggest that tannic acid is useful with any other anthocyanin pigment. Tannic acid has limited applicability in the food industry.

U.S. Pat. No. 4,285,982 indicates that certain synthetic flavonoid sulfonate derivatives and poly(hydroxyalkyl)-flavonol derivatives protect anthocyanins from sunlight-dependent degradation. These compounds are not encompassed within or similar to the pigment-improving agents of the present invention. Indeed, U.S. Pat. No. 4,285,982 does not show or suggest that these compounds protect against heat or time-dependent loss of color. The flavonoid sulfonates and poly(hydroxyalkyl)-flavonols discussed in U.S. Pat. No. 4,285,982 are synthetic compounds and are not FDA-approved food additives. These compounds have no usefulness in the food industry.

An object of this invention is to provide foods and beverages having improved anthocyanin pigmentation using naturally-occurring, biodegradable and easily-obtainable compounds which have no known toxic or carcinogenic effects. The compounds useful herein can all be derived from food and GRAS sources. Other objects and attributes of this invention will be apparent from the detailed description of the invention and examples set forth herein.

DETAILED DESCRIPTION OF THE INVENTION

We have now discovered that water-soluble plant extracts as described herein improve anthocyanin pigments. The compounds defined herein, alone or in natural extracts, are potent anthocyanin copigments and can protect against anthocyanin color loss. As used herein, the term "water-soluble plant extracts" means plant extracts which are soluble in water and which can be obtained using the general methods recited herein and other equivalent methods generally known in the art. Active agents contained in such extracts include certain flavonoid glycosides including, but not limited to, flavonoid glycuronides, luteolin glycosides, and caffeic acid derivatives including rosmarinic acid. We have now found that naturally occurring flavonoid glycuronides, including luteolin and apigenin glycuronides, are surprisingly effective pigment-improving agents.

The pigment-improving agents of the present invention are potent copigments for anthocyanins. In other words, they are effective in deepening the color of anthocyanins and increasing their intensity. As shown by the examples herein, we have found that luteolin 3'-O-β-glucuronide (L3'G), luteolin 7-O-β-glucuronide (L7GA), luteolin 7-O-β-[glucuronosyl-(1→2)]-glucuronoside (LDG), and apigenin 7-O-β-glucuronide (AP7GA) are at least as potent as the most effective copigments previously recognized. (Cf. the data regarding swertisin reported by Asen at al. in "Copigmentation of Anthocyanins in Plant Tissues and its Effect on Color," *Phytochemistry*, 11, 1139 (1972) and replicated herein.)

In addition, the pigment-improving agents of the present invention protect anthocyanin pigments from color loss caused by light, heat and/or pH.

Glucuronides derived from rosemary, sage, and peppermint have now been found to be unexpectedly-potent pigment-improving agents. Rosemary, peppermint, and sage are generally recognized as safe ("GRAS") food substances which means that FDA approval is not required before including these materials in foods and beverages. Other plant materials containing flavonoid glycuronides may also yield water-soluble plant extracts with pigment-improving agents of the present invention.

Non-limiting examples of food and GRAS plant material containing flavonoid glycuronides which are useful as source materials to practice the present invention include those set forth in Table I.

TABLE I

SUBSTANCES CONTAINING FLAVONOID GLYCURONIDES

| FAMILY | GENUS/SPECIES | COMMON NAME |
|---|---|---|
| Labiatae | Rosmarinus officinalis | Rosemary |
| " | Mentha X piperita | Peppermint |
| " | Mentha spicata | Spearmint |
| " | Salvia officinalis | Sage |
| " | Thymus officinalis | Thyme |
| " | Satureja hortensis | Summer Savory |
| " | Origanum majorana | Marjoram |
| Rosaceae | Fragarua SPP | Strawberry |
| " | Rubus ideaus | Raspberry |
| Compositae | Silybum marianum | Milk Thistle |
| " | Sonchus oleraceus | Sow Thistle |
| " | Arnica montana | Leopard's Bane |
| " | Centaurea cyanus | Cornflower |
| " | Centaurea calcitrape | Star Thistle |
| Umbelliferae | Anethum graveolens | Dill |
| " | Daucus carota | Carrot |

TABLE I-continued

SUBSTANCES CONTAINING FLAVONOID GLYCURONIDES

| FAMILY | GENUS/SPECIES | COMMON NAME |
|---|---|---|
| " | Foeniculum vulgare miller | Fennel |
| " | Cuminum cyminum | Cumin |
| Malvaceae | Malva sylvestris | High Mallow |
| Leguminosae | Phaseolus vulgaris | Green bean |

Flavonoid glucuronides contained in foods and GRAS plant materials include: luteolin 7-glucuronide; luteolin 3'-glucuronide; luteolin 7-diglucuronide; luteolin 7-glucuronide-3'-ferulyglucoside; apigenin 7-glucuronide; quercetin 3-(isoferulylglucuronide); 7-sulfatoglucuronides of tricin and luteolin; 3-glucuronide-7-sulfate of kaempferol, quercetin, or isorhamnetin; quercetin 3-glucuronide-3'-sulfate; gossypetin 8-glucuronide-3-sulfate; rhamnetin 3'-glucuronide-3,5,4'-trisulfate; the 7-glucuronide and 8-glucuronide of 5,7,8-trihydroxyflavone (norwogonin), 5,7,2'-trihydroxyflavone 7-glucuronide; apigenin 7-rhamnosyl-(1→2)-galacturonide; apigenin 7-digalacturonide; apigenin 7-galacturonylglucoside; apigenin 7-sulfatoglucuronide; 5,6,7,2'-tetrahydroxyflavone 7-glucuronide; 5,7,2'-trihydroxy-8-methoxyflavone 7-glucuronide; 5,7-dihydroxy-8,2'-dimethoxyflavone 7-glucuronide; luteolin 7-galacturonide-4'-glucoside; 8-hydroxyluteolin 4'-methyl ether 8-glucuronide; tricetin 7,3'-diglucuronide; tricetin 3'-methyl ether 7,5'-diglucuronide; apometzgerin 7-glucuronide; 8-hydroxytricetin 7-glucuronide; kaempferol 3-rhamnoside-7-galacturonide; kaempferol 3-glucoside-7-glucuronide; eupafolin 3-glucuronide; herbacetin 3-glucuronide-8-glucoside; quercetin 3-glucoside-7-glucuronide; quercetin 3-gentiobioside-7-glucuronide; quercetin 3-glucuronide-3'-sulfate; tamarixetin 5-glucoside-7-glucuronide; quercetin 3',4'-dimethyl ether 5-glucoside-7-glucuronide; gossypetin 3-glucoside-8-glucuronide; and gossypetin 3-glucuronide-8-glucoside.

All of the above-mentioned plant materials and the glycuronides obtainable therefrom are useful to practice the invention.

Table II contains a partial list of GRAS Substances containing flavonoid glucosides.

TABLE II

GRAS SUBSTANCES CONTAINING FLAVONOID GLYCOSIDES

| FAMILY | GENUS/SPECIES | COMMON NAME |
|---|---|---|
| Umbelliferae | Apium graveolens | Celery Seeds |
| " | Anethum graveolens | Dill |
| " | Petroselinum crispum | Parsley |
| Compositae | Matricaria recutita | Chamomile |
| " | Cynara scolymus | Artichoke |
| " | Artemisia dracunculus | Tarragon |
| " | Taraxacun officinale | Dandelion |
| Lythraceae | Lawsonia inermis | Henna |
| Oleaceae | Olea europaea | Olive |
| Gramineae | Avena sativa | Oat |
| " | Hordeum vulgare | Barley |
| Labiatae | Ocimum basilicum | Basil |
| " | Mentha aquatica | Water Mint |
| " | Origanum majorana | Marjoram |
| " | Rosemary officinalis | Rosemary |
| " | Salvia triloba | Greek Sage |
| Amaryllidaceae | Allium schoenoprasum | Chives |

Extracts containing pigment-improving agents can be prepared from the starting materials identified in Tables I &

II using water and/or alcohol extraction techniques. As an example, "water-soluble rosemary extract" ("WSRE") can be prepared from either regular (virgin) whole, dried, rosemary leaves; whole, dried de-oiled rosemary leaves; or spent rosemary leaves which have been previously extracted.

The process is generally described as follows. Rosemary biomass is placed in a suitable extraction vessel and covered with hot water. The temperature in the vat is maintained at 90° C. for 5–8 hours during which the mixture of biomass and hot water is stirred occasionally. After the extraction is complete, the liquid is drained from the extractor and passed through a coarse filter which separates the liquid extract containing the desired compounds from the spent rosemary biomass. The resulting dark brown extract is then pumped to a suitable container whereupon it is agitated while a mineral acid such as phosphoric, sulfuric or hydrochloric acid is added slowly until a pH of 1.7–3.5 is obtained (preferably 2.0). The acidification can be done while the extract is still hot or after it has cooled to room temperature. After the acidified extract is cooled to room temperature it is loaded onto a suitable column containing a reversed-phase media such as C-18, polyaromatic, polyacrylic ester, or polymethacrylic ester. The preferred reversed-phase media is XAD-16 (polyaromatic: Rohm and Hass Co., Philadelphia, Pa.). During the loading of the acidified extract many of the undesired sugars, salts, cellulose, and insoluble substances pass through the column, while the desired compounds such as rosmarinic acid (RA) and luteolin 3'-O-$\beta$-glucuronide (L3'G) are retained. The volume of the column (and hence the reversed-phase media contained therein) is such as to allow greater than 90% of the desired compounds present in the loading solution to be retained on the column. After all the acidified extract has been loaded onto the column it is washed with about 2 column volumes of acidified water to remove residual impurities and then the column is purged using air. The desirable compounds are then eluted from the column using an alcohol such as methanol or ethanol (preferably 95% ethanol). Approximately 2 column volumes of eluting solvent are required to elute approximately 100% of the desirable compounds from the column. The resulting eluant can be concentrated by distillation (preferably under reduced pressure) to yield a dark, brown viscous liquid product which has an ethanol content of approximately 10–20% (w/v), a solids content of approximately 40–60% (w/v), an RA, i.e., rosmarinic acid, content of approximately 10–18% (w/w) of the solids, and an L3'G content of approximately 4–5% (w/w) of the solids.

The above-mentioned process or other commonly known extraction process can be used on any of the other biomass mentioned in Tables I & II.

The present invention includes food products having an anthocyanin pigment additive and an effective amount of a pigment-improving agent, as described herein. As noted previously, "food products" broadly includes both solid foods, liquid beverages and other edible materials regardless of their specific form. Indeed, the present invention is not limited to foods and can include pigment systems for other products particularly those, such as cosmetics, which come into human contact.

In that regard, the present invention broadly includes an improved pigment composition comprising an anthocyanin pigment additive and a pigment-improving agent, as described herein. The composition can be sold as an additive for foods or other products and can be prepared in a dry, e.g., powdered, form or as a water or alcohol-based concentrate or syrup depending on the end use and the proposed method of addition.

Indeed, the present invention includes the method of improving an anthocyanin pigment or anthocyanin containing food product by applying an effective amount of a pigment-improving agent, as described herein. The agent can be incorporated as a solid or an aqueous solution or syrup at various stages during the manufacture or processing of the food product.

The following non-limiting examples are illustrative of the invention.

EXAMPLES

Example 1

The following example depicts the process of preparing water-soluble rosemary extract ("WSRE").

Whole, dried rosemary leaves (10.0 g) were weighed into a 0.5 L jar and 0.25 L of de-ionized water was added. The jar was sealed and placed in an oven set at 90° C. for eight hours. After cooling to room temperature the broth containing the desirable water-soluble compounds was filtered through a glass-fiber filter with the aid of suction. This produced 240 ml of a nearly clear, dark brown extract with a pH of 5.0. The rosmarinic acid (RA) content of this filtrate was analyzed by HPLC and found to be 0.46 mg/ml (110 mg total; 90% of the amount in the starting biomass) and the luteolin 3'-glucuronide content was similarly analyzed and found to be 0.23 mg/ml (55 mg total or 92% of the amount in the starting biomass). The crude extract was then acidified to a pH of 2.0 using sulfuric acid whereupon some fine, light-brown colored solids precipitated which were not removed prior to the next step. After cooling the acidified primary extract to room temperature, it was loaded onto a 1 cm×4 cm column packed with XAD-16 solid-phase absorbent at a flow rate of 2 ml/min. The desirable components of the water-extract (caffeic acid derivatives and flavonoid glycuronides and glycosides) were retained on the column while many of the undesirable components (sugars, salts, and insolubles) passed through. After the entire volume of acidified extract was loaded, the column was washed with about 25 ml of water containing 1:1000 sulfuric acid and then blown dry. The desired compounds were then eluted using 50 ml of 95% ethanol. The ethanol eluant contained essentially 100% of the RA and L3'G that was applied to the column. Most of the ethanol could be removed under reduced pressure yielding approximately 2 ml of a dark brown syrup-like liquid containing approximately 15% ethanol and 410 g/L solids and 57 g/L RA and 18 g/L L3'G.

Example 2

The copigmentation effect of WSRE on natural anthocyanin pigments was verified with the following experiments performed using the materials and methods described below.

All buffer solutions were prepared with $NaH_2PO_4$ to a concentration of 30.2 grams/Liter. Each buffer was then adjusted to appropriate pH with either $H_3PO_4$ or $Na_2CO_3$.

WSRE was prepared as described in Example 1. WSRE solutions were prepared in buffer solution at solid concentrations of 2000 ppm, 1000 ppm, 500 ppm and 200 ppm. The solutions were then adjusted to appropriate pH with either citric acid or $Na_2CO_3$.

Natural color solutions were prepared from grape, hibiscus, elderberry, and red cabbage.

Solutions of grapeskin extract were prepared by diluting Tastemaker Grapeskin Extract in the appropriate buffer solution at 1:125 (0.8% v/v). Tastemaker Grapeskin Extract is available from Tastemaker, Inc., Cincinnati, Ohio. The solutions were then adjusted to appropriate pH with either citric acid or $Na_2CO_3$.

Solutions of hibiscus were prepared by dissolving spray dried hibiscus commercially available from Hauser Chemical Research, Inc., Boulder, Colo. in the appropriate buffer solution to a concentration of 5 mg/mL. The solutions were then adjusted to appropriate pH with either citric acid or $Na_2CO_3$.

Solutions of elderberry were prepared by diluting Clermont Elderberry Concentrate in the appropriate buffer solution at 1:125 (0.8% v/v). The solutions were then adjusted to appropriate pH with either citric acid or $Na_2CO_3$. Clermont Elderberry Concentrate is commercially available from Clermont, Inc., Hillsboro, Oreg.

Solutions of red cabbage were prepared by dissolving Warner-Jenkinson Red Cabbage Extract in the appropriate buffer solution at 1:1000 (0.1% v/v). The solutions were then adjusted to appropriate pH with either citric acid or $Na_2CO_3$. Warner-Jenkinson Red Cabbage Extract is commercially available from Warner-Jenkinson Company, Inc., St. Louis, Mo.

The following samples were prepared for each study: WSRE extract control, a natural color control, and samples containing natural colors and WSRE.

WSRE extract control was prepared by combining 5 mL of WSRE solution with 5 ml of buffer solution. The final extract concentration of the sample was one-half the concentration of the Hauser's extract solution (e.g. 5 mL of 2000 ppm extract solution combined with 5 mL buffer had a final WSRE concentration of 1000 ppm).

Each natural color control was prepared by combining 5 mL of color solution with 5 mL of buffer. Final dilutions and concentrations of the color extract controls were:

Grapeskin—1:250, 0.4% v/v

Hibiscus—2.5 mg/mL

Elderberry—1:250, 0.4% v/v

Red Cabbage—1:2000, 0.05% v/v

The natural color solutions made in pH 2 buffer were diluted further with buffer in order to keep the absorbance within scale.

Five mL of each natural color solution were combined with 5 mL of WSRE solution prepared as described in this example, producing the following concentrations:

Grapeskin—1:250, 0.4% v/v WSRE—1000 ppm, 500 ppm, 250 ppm, or 100 ppm

Hibiscus—2.5 mg/mL WSRE—1000 ppm, 500 ppm, 250 ppm, or 100 ppm

Elderberry—1:250, 0.4% v/v WSRE—1000 ppm, 500 ppm, 250 ppm, or 100 ppm

Red Cabbage—1:2000, 0.5% v/v WSRE—1000 ppm, 500 ppm, 250 ppm, or 100 ppm

All samples were filtered through a $0.45\mu$ PTFE filter prior to absorbance measurement. All absorbances were taken on a Hitachi U-2000 Double Beam UV/Vis Spectrophotometer (Hitachi Instruments Inc., Dallas, Tex.) with a 1 cm cell. A visible wavelength scan was used to determine the wavelength ($\lambda_{max}$) at which the maximum absorbance occurred for each sample. The color plus WSRE sample was normalized by subtracting the absorbance of the WSRE control at the shifted $\lambda_{max}$.

Tables III through VI list the average hyperchromic and bathchromic effects for varying WSRE concentrations and varying PH conditions:

TABLE III

COPIGMENTATION EFFECT OF GRAPESKIN WITH WSRE

| WSRE Concentration (ppm) | pH | Average Hyperchromic Effect (% Increase) | Average Bathochromic Effect (nm Increase) |
|---|---|---|---|
| 1000 | 3 | 10.9% | 12 |
| 500 | 3 | 6.8% | 8 |
| 250 | 3 | 2.8% | 6 |
| 100 | 3 | 1.8% | 2.5 |
| 1000 | 2 | 3.9% | 13 |
| 1000 | 4 | 17.2 | 8 |
| 1000 | 5 | 5.9 | 10.5 |

TABLE IV

COPIGMENTATION EFFECT OF HIBISCUS WITH WSRE

| WSRE Concentration (ppm) | pH | Average Hyperchromic Effect (% Increase) | Average Bathochromic Effect (nm Increase) |
|---|---|---|---|
| 1000 | 3 | 8.7% | 8 |
| 500 | 3 | 8.7% | 6.5 |
| 250 | 3 | 6.5% | 5 |
| 100 | 3 | 1.6% | 2.5 |
| 1000 | 2 | NONE | 8 |
| 1000 | 4 | 30.3% | 8 |
| 1000 | 5 | 1.0% | 3.5 |

TABLE V

COPIGMENTATION EFFECT OF ELDERBERRY WITH WSRE

| WSRE Concentration (ppm) | pH | Average Hyperchromic Effect (% Increase) | Average Bathochromic Effect (nm Increase) |
|---|---|---|---|
| 1000 | 3 | 6.4% | 7 |
| 500 | 3 | 4.7% | 6.5 |
| 250 | 3 | 2.2% | 3.5 |
| 100 | 3 | 0.8% | 0 |
| 1000 | 2 | 5.1% | 7 |
| 1000 | 4 | 4.5% | 10 |
| 1000 | 5 | NONE | 1.5 |

TABLE VI

COPIGMENTATION EFFECT OF RED CABBAGE WITH WSRE

| WSRE Concentration (ppm) | pH | Average Hyperchromic Effect (% Increase) | Average Bathochromic Effect (nm Increase) |
|---|---|---|---|
| 1000 | 3 | 8.0% | 4.5 |
| 500 | 3 | 3.3% | 7 |
| 250 | 3 | 1.3% | 6 |
| 100 | 3 | NONE | 4.5 |
| 1000 | 2 | 0.3 | 6 |
| 1000 | 4 | 14.9 | 7 |
| 1000 | 5 | NONE | 7 |

Tables III through VI show that WSRE improved the intensity of the anthocyanin-based pigments in grapeskin, red cabbage, hibiscuss and elderberry. Both a hyperchromic and bathochromic effect was seen in all pigments, indicating the exitence of copigmentation. These effects vary with the concentration of WSRE.

Example 3

The copigmentations effect of WSRE on natural anthocyuanin pigments was also verified using the juice of blackberries, cranberries, raspberries, and strawberries.

One pound of frozen fruits (Top Crest blackberries, Ocean Spray cranberries, Top Crest raspberries, Top Crest strawberries) was juiced in a juicer (Acme Supreme Juicerator, Sierra Madre, Calif.), and the pulp was discarded. The Top Crest products are commercially available from King Soopers, Inc., Denver, Colo., and the Ocean Spray cranberries are available from Ocean Spray Cranberries, Inc., Lakeville-Middleboro, Mass. The blackberry, raspberry and strawberry juices were then centrifuged to removed solids.

One liter of pH 3 buffer was prepared by adding 30.1 grams $NaH_2PO_4$ to 800 mL DI water and adding concentrated $H_3PO_4$ until a pH of 3 is reached. DI water was added to bring the solution to 1 L volume. The juices were diluted in pH 3 buffer as follows: blackberry—1:25 (1 mL juice:25 mL total volume); cranberry—1:5 (5 mL juice:25 mL total volume); raspberry—1:20 (1.25 mL juice:25 mL total volume); and strawberry—1:3.5 (7 mL juice: 25 mL total volume). These juice dilutions were adjusted to pH 3 with either $Na_2CO_3$ or citric acid. The natural extract was prepared in pH 3 buffer by diluting 440 μL of natural extract in 100 mL total volume. This solution was also adjusted to pH 3. This produced a solution containing 2000 ppm solids natural extract.

Sample Preparation: A control was prepared by mixing 5 mL of pH 3 buffer with 5 mL natural extract solution (producing a 1000 ppm solids natural extract sample). Controls were prepared by mixing 5 mL of each juice color with 5 mL pH 3 buffer. Samples containing juice and the natural extract were prepared by mixing 5 mL of each juice color with 5 mL of 2000 ppm natural extract solution. Juice samples had final concentrations of 2% blackberry juice, 10% cranberry juice, 2.5% raspberry juice and 14.2% strawberry. Samples containing natural extract had final concentrations of 1000 ppm solids.

Samples were filtered with a 0.45 μm PTFE filter and the initial absorbance was measured on a Hitachi UV/Vis Spectrophotometer with a 1 cm cell. A visible wavelength scan was used to determine the wavelength ($\lambda_{max}$) at which the maximum absorbance occurred for each sample. The color plus extract sample was normalized by subtracting the absorbance of the extract control at the shifted $\lambda_{max}$. The results are set forth in Table VII.

TABLE VII

Copigmentation Effect on Various Juices with 1000 ppm Natural Extract

| Fruit Juice | pH | Average Hyperchromic Effect (% Increase) | Average Bathochromic Effect (nm Increase) |
|---|---|---|---|
| Blackberry | 3 | 14.6% | 11 |
| Cranberry | 3 | 10.4% | 12 |
| Raspberry | 3 | 8.8% | 8 |
| Strawberry | 3 | 13.1% | 8.5 |

These results evidence copigmentation. A hyperchromic and bathochromic effect was seen in all juice samples.

Example 4

The copigmentation power of hot water extracts of various biomass samples was tested using purified bilberry anthocyanins as a substrate. A commercial purified bilberry extract was used because it contained a mixture of 3-glycosyl anthocyanins with a high purity (30% or greater) and did not contain significant amounts of copigments. Each biomass extract was prepared in the exact same manner and tested alike so that differences observed in the copigmentation of the bilberry anthocyanins would reflect differences in the concentrations of copigmentation compounds extracted from the biomass samples.

The biomass samples were prepared as follows. Each powdered sample (0.75 g) was weighed into a scintillation vial and 15.0 ml of deionized (DI) water was added and the total vial weight was determined. The sample was placed in a 100° C. oven for 4–6 hours and, after cooling, was reweighed to determine if any water was lost. If water was lost then it was added back until the original weight was achieved. The samples were filtered through a 0.45μ PTFE membrane filter or in some difficult cases centrifuged and then filtered.

The substrate was prepared as follows. Indena bilberry (25 mg; 3-glycosyl anthocyanin chloride assay=37%; commercially available from Indena, R. Milan, Italy) was dissolved in 25 ml of pH 3.3 citrate-phosphate buffer and filtered through a 0.45μ PTFE filter before use.

The filtered extract (0.50 ml) and substrate (0.50 ml) were pipetted in a 1.5 ml HPLC vial fitted with a magnetic stir bar and a combination pH microelectrode. The pH was adjusted to 3.50±0.05 using either oxalic acid or sodium acetate. For the control, 0.50 ml of DI water was used instead of the sample. Absorption spectra were determined after a few minutes using a Hitachi UV-2000 spectrophotometer in a 1 mm pathlength glass cell. The absorption at the maximum was determined from the curve. The absorbance was also determined at 900 nm to ascertain whether the mixture contained a precipitate. The absorbance of the sample/anthocyanin mixture was corrected for the absorbance due to the sample alone at the wavelength of maximum absorbance, and in a few cases the absorbance was corrected for the absorbance observed at 900 nm due to precipitation.

The percent absorbance increase at $\lambda_{max}$ (% copigmentation effect) was calculated by taking the difference between the absorption of the control at its $\lambda_{max}$ (0.302) and that of the corrected sample absorbance divided by the absorbance of the control times 100.

The results are set forth in Table VIII.

TABLE VIII

COPIGMENTATION OF BILBERRY BY WATER EXTRACTS OF VARIOUS EDIBLE FOODS AND SPICES

| BIOMASS | $\Delta\lambda_{max}$ (nm) | % A INCREASE | COPIGMENTS |
|---|---|---|---|
| Rosemary Extract 1/5 | 25 | 93.0 | RA, L3'G, L7GA, OF, P |
| Peppermint, Bulk | 24 | 104.0 | LDG, RA, L3'G, C, OF, P |
| Sage, Spice | 24 | 91.1 | L7GA, LDG, AP7GA, RA, OF, P |
| Rosemary, Moroccan | 23 | 83.8 | L3'G, RA, L7GA, OF, P |
| Peppermint, USA | 22 | 96.4 | LDG, RA, L7GA, OF, P |
| Rosemary, Turkish | 22 | 90.4 | L3'G, RA, L7GA, OF, P |
| Rosemary, Spent | 22 | 84.8 | L3'G, RA, L7GA, OF, P |
| Sage, Albanian | 20 | 72.5 | L7GA, AP7GA, LDG, RA, OF, P |
| Peppermint, Egypt | 18 | 86.4 | LDG, RA, L7GA, L3'G, OF, P |

TABLE VIII-continued

COPIGMENTATION OF BILBERRY BY WATER EXTRACTS OF VARIOUS EDIBLE FOODS AND SPICES

| BIOMASS | $\Delta\lambda_{max}$ (nm) | % A INCREASE | COPIGMENTS |
|---|---|---|---|
| Cumin | 18 | 60.9 | AP7GA, LDG, OF, P |
| Garden Mint | 18 | 57.3 | RA, L7GA, L3'G, OF, P |
| Spearmint | 16 | 69.9 | RA, L7GA, L3'G, OF, P |
| Bergamot Mint | 14 | 78.8 | RA, L7GA, LDG, OF, P |
| Marjoram | 14 | 73.8 | RA, AP7GA, L7GA, OF, P |
| Thyme | 14 | 70.9 | L7GA, RA, P |
| Catnip | 14 | 56.6 | LDG, C, OF |
| Summer Savory | 12 | 79.1 | RA, L7GA, LDG, L7GA, OF, P |
| Oregano | 12 | 57.3 | OF, P |
| Water Calamint | 9 | 60.3 | RA, OF, P |
| Penny Royal Mint | 9 | 57.0 | RA, OF, P |
| California Bay Leaves | 8 | 65.6 | P, OF, C |
| Dill Weed | 8 | 65.2 | C, OF, P |
| Sweet Basil | 8 | 47.4 | RA, P |
| Licorice | 7 | 78.1 | OF, P |
| Allspice | 7 | 69.2 | P |
| Basil | 7 | 47.0 | RA, P |
| Cilantro | 6 | 67.2 | C, P |
| Spinach | 6 | 56.3 | P, OF |
| Tarragon | 6 | 55.3 | P |
| Celery Seed | 5 | 32.5 | OF |
| Parsley | 3 | 60.3 | OF, P |
| Snipped Chives | 3 | 52.0 | P |
| Fennel Seed | 2 | 60.3 | P, C, OF |
| Anise Seed | 2 | 60.3 | P, C, OF |
| Mustard | 2 | 56.0 | P, OF |
| Dill Seed | 2 | 52.0 | P, OF |
| Soy Molasses | 2 | 35.4 | P |
| Broccoli | 2 | 34.1 | P |
| Caraway Seed | 1 | 54.0 | C, P |
| Carrot | 1 | 54.0 | |
| Peanut Hulls | 1 | 46.0 | |
| Malaber Pepper | 0 | 58.9 | P |
| Cinnamon | 0 | 49.3 | |
| Mild Green Chilies | 0 | 48.3 | |
| Tomato | 0 | 46.4 | |
| Coriander | 0 | 26.2 | P |
| Nutmeg | -1 | 36.8 | |
| Poppy Seed | -2 | 58.3 | |
| Hulled Sesame Seed | -2 | 42.4 | |
| Cardamon | -2 | 36.8 | |
| Chervil | Precipitated | | C, P |

RA = Rosmarinic Acid; L3'G = Luteolin 3-Glucuronide; L7GA = Luteolin 7-Glucuronide; LDG = Luteolin Diglucuronide; AP7GA = Apigenin 7-Gluruonide; C = Caffeic Acid Compounds; OF = Other Flavonoids Compounds; P = Phenolic Compounds.

These results show that water-soluble extracts from certain GRAS plant materials, in addition to rosemary, are also powerful copigments.

Example 5

Tests were performed to isolate the compounds contained in WSRE. We isolated RA and L3'G as described below.

275 ml of WSRE containing 19 g of RA was placed in a 6 liter separatory funnel with an equal volume of water. Methyl t-butyl ether (MTBE: 2 L) was added, the mixture shaken and the layers allowed to separate. The dark aqueous layer was removed, the MTBE layer was washed 3 times with 200 ml of 1:250 HCl solution and the washes were discarded. The MTBE layer was filtered through anhydrous sodium sulfate into a flask and evaporated to a yellow solid under reduced pressure. The resulting yellow crude RA solids contained 18 g of RA at a purity of 60%. A 5 g portion of these solids were crystallized from hot water yielding a 90% recovery of off-white crystals which were 84% RA. A portion (0.73 g) of these crystals were recrystallized from hot water with a small amount of decolorizing charcoal to yield 0.55 g of white crystals of RA with an assay of 95%. The HPLC retention time, UV spectrum and $^1$H NMR spectrum of the sample were identical to a sample of RA purchased from Indofine Chemical Co., Inc., Somerville, N.J.

L3'G was isolated as follows: Acidified water extract of rosemary leaves (360 ml) were extracted with MTBE to remove the RA. The aqueous layer was then passed through a 2.5 cm×8 cm XAD-16 column which captured the L3'G. The column was then washed with 100 ml of 0.5% HCl followed by 30:70:1 mixture of methanol (MeOH), $H_2O$, trifluoroacetic acid (TFA). The column was then eluted with a 30:70:1 mixture of MeOH, $H_2O$, concentrated ammonium hydroxide. The eluant was acidified with TFA and the methanol was removed under reduced pressure. The remaining aqueous solution was extracted 5 times with 40 ml of ethyl acetate. The combined ethyl acetate extracts were dried by shaking with saturated sodium chloride solution followed by anhydrous sodium sulfate. The ethyl acetate solution was then passed through a 2.5 cm×10 cm silica flash chromatography column. The eluant was then evaporated under reduced volume to give a yellow solid which was dissolved in hot water and filtered. Upon cooling, yellow crystals of L3'G formed which were collected by filtration and dried at 50° C. under vacuum. The $^1$H and $^{13}$C NMR JEOL Eclipse 400 NMR Spectometer (JEOL USA, Inc., Peabody, Mass.) spectra of the L3'G in DMSO-$d_6$ were identical to data published by Okamura, et al., *Phytochemistry*, Vol. 37, No. 5, pp. 1463 (1994).

The copigmentation effect of RA and L3'G with other known copigments using the method of Asen et al. is shown in Example 7. Surprisingly, these results show that L3'G is a much more effective copigmentation agent than the other compounds tested, including the luteolin 7-glucoside (L7G). See Table IX.

Example 6

Tests were performed to isolate and study the pigment-improving effects of glucuronides (other than L3'G) extracted from sage. Like rosemary, sage is a member of the Labiatae family and is GRAS. From sage, we extracted luteolin 7-O-β-glucuronide (L7GA) and luteolin 7-O-β-[glucuronosyl-(1→2)]-glucuronide (LDG); as described below, sage also has apigenin 7-O-β-glucuronide (AP7GA).

Luteolin 7-O-β-glucuronide (L7GA) was obtained by mixing 15 g of powdered sage with 100 ml of water in a sealed jar and placed in a 90° C. oven for 16 hours. After cooling the mixture was filtered yielding 95 ml of a dark brown clear filtrate containing about equal quantities of L7GA and RA. The extract was acidified to pH 2 and extracted with 150 ml of MTBE to remove the RA. The aqueous layer was then loaded onto a 2.5 cm×10 cm XAD-16 column and washed with 1:100 concentrated HCl/water followed by 1 column volume of water. The L7GA was then eluted with 100% MeOH. The eluant was evaporated to a dry solid under reduced pressure, the solids were triturated with ethyl acetate, and the insoluble solids containing L7GA were collect by vacuum filtration. The crude L7GA solids with about 20% L7GA were then dissolved in a little MeOH, filtered and loaded onto a 2.5 cm×13 cm silica flash chromatography column and first washed with 60/40 MeOH/ethylacetate and then eluted with 100% MeOH. The eluant was reduced to a yellow solid under reduced pressure, dissolved in 1:1 MeOH/$H_2O$ and injected on a 2.5 cm×20 cm Novapak C-18 semi-prep HPLC system using a mobile phase consisting of 25:75:0.1 acetonitrile, $H_2O$, TFA at 15 ml/min flow rate. The L7GA eluted in about 9 min and the combined eluant peaks from several runs were evaporated under reduced pressure to remove the acetonitrile and then the remaining water solution was lyophilized to yield L7GA as a yellow powder. Hydrolysis of L7GA with dilute HCl at 100° C. gave luteolin. Electrospray LC/MS (Fisons Instruments VG Platform Quadrupole, Manchester, United Kingdom) of the L7GA showed that it had a molecular weight of 462, and its UV spectrum was identical to luteolin 7-glucoside. Its $^1H$ NMR spectrum was consistent with the assigned structure.

To prepare LDG, we used an extract of sage from the process described above for the isolation of L7GA. This extract contained a polar luteolin compound with the same UV spectrum as L7GA which was retained on the silica flash chromatography column after L7GA was eluted using 100% MeOH. This compound was tentatively identified as LDG based on its mass of 638, by electrospray LC/MS. The LDG was eluted from the silica flash column using 1:1 MeOH/$H_2O$ and then reduced to a dry yellow solid by evaporation under reduced pressure. The solids were then dissolved in a small amount of water and injected on the same semi-prep HPLC system describe above for L7GA using a mobile phase of 20:80:0.1 MeOH, $H_2O$, TFA. The LDG peak eluted after about 8 min and was collected, evaporated to remove the acetonitrile and then lyophilized to give LDG as a yellow powder. Partial hydrolysis of LDG by heating it with 10% HCl in ethanol converted much of the LDG to L7GA. The $^{13}C$ NMR and the $^1H$ NMR spectra of LDG in DMSO-$d_6$ were consistent with its being a diglucuronide of luteolin attached at the 7-position.

Apigenin 7-O-β-glucuronide (AP7GA) was tentatively identified as a constitutent of the sage extract from its UV spectrum, identical to apigenin 7-glucoside, and its molecular weight of 446 by LC/MS. Since AP7GA was reported to be a major compound in snapdragon flowers (2), it was decided to isolate AP7GA from snapdragon flowers instead of from the sage extract. Approximately 150 white and yellow snapdragon flowers were placed in a 1 liter jar along with 500 ml of 1:1 MeOH/$H_2O$ and homogenized using a homogenizer at 1600 rpm. The homogenate was then filtered through a Celite filter bed with added Celite to the body yielding a clear yellow filtrate containing approximately 300 mg of AP7GA. The MeOH was removed under reduced pressure and the aqueous solution was loaded on a 2.5 cm×10 cm column packed with Amberchrome CG-161c polyaromatic media (Toso Haas, Montgomeryville, Pa.). The column was then eluted sequentially with 100 ml fractions of 10–100% MeOH in water. The AP7GA eluted in the 60 and 70% MeOH fractions. The combined fractions were reduced in volume under reduced pressure to approximately 10 ml whereupon the L7GA crystallized out as a yellow solid. The $^1H$ NMR spectrum of the L7GA was consistent with the assigned structure.

Example 7

Tests were performed to compare the ability of the rosemary and sage-derived glucuronides isolated in Example 6 to copigment with cyanidin 3,5-diglucoside as compared to the copigments reported by S. Asen, R. N. Stewart and K. H. Norris; "Copigmentation of Anthocyanins in Plant Tissues and its Effect on Color," *Phytochemistry*, 11, 1139 (1972).

According to the method of Asen et al., the 4 mM cyanidin 3,5-diglucoside (cyanin) solution was made by dissolving 21 mg of cyanin chloride (Indofine Chemical Co., Somerville, N.J.) in 8.0 ml of warm pH 2.24 citrate-phosphate buffer (0.1M each). After cooling the dark red solution was filtered through a 1μ PTFE membrane filter. When 0.5 ml of this stock was diluted with 0.5 ml of 0.12N NaOH and the pH adjusted to 3.32 with the addition of a small amount of sodium acetate, the resulting 2 mM solution had an absorbance of 0.528 in a 1 mm cell at 507 nm. Asen reported that in his hands a 6 mM cyanin chloride solution had an absorbance of 0.500 at 508 nm.

The copigments were either purchased from commercial sources or isolated as described previously. In the case of swertsin, the material was isolated as follows. The petals from 1 dozen blue iris ("Prof. Blaauw" variety) were homogenized with 500 ml of 1:1 methanol/$H_2O$ in a one liter jar using a homogenizer at 1600 rpm. The homogenate was then filtered through a Celite filter bed with added Celite to the body yielding a clear blue filtrate. The MeOH was removed under reduced pressure and the aqueous solution was loaded on a 2.5 cm×10 cm column packed with Amberchrome CG-161c polyaromatic media. The column was then eluted sequentially with 100 ml fractions of 10–100% MeOH in water. The swertisin precursor compound (MW=634) eluted in the 70% MeOH fraction along with an isovitexin precursor compound (MW=620). The 70% fraction was hydrolyzed using 2 ml concentrated HCl per 100 ml of sample at 100° C. for about 30 min. This converted the swertisin and isovitexin precursor compounds to swertisin and isovitexin (the loss of 188 AMUs corresponded to the hydrolysis of an acetylrhamnosyl group). The hydrolyzed eluant was evaporated under reduced pressure to approximately 10 ml and injected on a 2.5 cm×20 cm Novapak C-18 semi-prep HPLC system using a mobile phase consisting of 20:80:0.1 acetonitrile, $H_2O$, TFA at 15 ml/min flow rate. The swertisin eluted at approximately 22 min after isovitexin but before isoswertisin. The swertisin obtained was chromatographically pure and was further purified by crystallization from a small amount of hot methanol/$H_2O$.

Samples of copigments were made by dissolving 12.0 μmoles of the copigment in 1.00 ml of 0.12N NaOH in a 1.5 ml vial. The copigment was weighed into the vial to the nearest 0.01 mg using a semi-micro analytical balance.

Into a 1.5 ml vial fitted with a micro stir bar were pipetted 0.400 ml of cyanin solution and 0.400 ml of copigment solution. The pH of the resulting mixture containing 2 mM of cyanin chloride and 6 mM of copigment was checked using a combination micro pH electrode, and a small amount of either sodium acetate or oxalic acid was added in order to adjust the pH of the solution to 3.32±0.02. Absorption spectra were determined after about 15 min using a Hitachi U-2000 spectrophotometer in either a 1 mm or 0.1 mm pathlength glass cell. The absorption at the maximum was determined from the curve.

The percent absorbance increase at $\lambda_{max}$ (% copigmentation effect) was calculated by taking the difference between the absorption of the control at its $\lambda_{max}$ (0.528) and that of the sample divided by the absorbance of the control times 100. The results are shown in Table IX.

TABLE IX

COMPARISON OF GLUCURONIDES TO SWERTISIN

| Copigments (6 mM) | $\lambda_{max}$ (nm) | $\Delta\lambda_{max}$ (nm) | A/mm. @ $\lambda_{max}$ | % A Increase @ $\lambda_{max}$ |
|---|---|---|---|---|
| None | 509 | 0 | 0.412 | NA |
| Swertisin | 533 | 24 | 1.275 | 209 |
| Luteolin 7-glucuronide | 543 | 34 | 1.815 | 341 |
| Luteolin 3'-glucuronide | 543 | 34 | 1.800 | 336 |
| Luteolin 7-diglucuronide | 540 | 31 | 2.065 | 401 |
| Apigenin 7-glucuronide | 543 | 34 | 1.835 | 345 |

Copigmentation of Cyanidin 3,5-diglucoside (2 mM) at pH 3.32 by the method of Asen et al.

TABLE X

CO-PIGMENTATION OF CYANIDIN 3,5-DIGLUCOSIDE (2 MM) AT PH 3.32 BY THE METHOD OF ASEN ET AL.[1]

| Copigments (6 mM) | $\lambda_{max}$ (nm) | $\Delta\lambda_{max}$ (nm) | A/mm. @ $\lambda_{max}$ | % A Increase @ $\lambda_{max}$ |
|---|---|---|---|---|
| None | 507 | 0 | 0.528 | NA |
| Chlorogenic Acid | 512 | 5 | 0.851 | 61 |
| Caffeic Acid | 513 | 6 | 0.731 | 39 |
| Rosmarinic Acid | 517 | 10 | 1.150 | 118 |
| Quercitrin | 526 | 19 | 1.430 | 171 |
| Luteolin 7-glucoside | 538 | 31 | 1.694 | 220 |
| Luteolin 7-glucuronide | 546 | 39 | 2.495 | 373 |
| Luteolin 3'-glucuronide | 546 | 39 | 2.480 | 370 |
| Luteolin 7-diglucuronide | 539 | 32 | 2.615 | 396 |
| Apigenin 7-glucuronide | 545 | 38 | 2.475 | 369 |

[1] S. Asen, R. N. Stewart and K. H. Norris, *Phytochemistry*, 11: 1139 (1972).

Surprisingly, the results demonstrate that the glucuronides were at least 50% more effective than the best copigments tested by Asen et al. and were better than the corresponding glucosides.

Example 8

Tests were performed to determine how the copigments of this invention would affect color loss of anthocyanin pigments due to heat and light.

The materials used are those described above in Example 2. Experiments were performed at 75° C., at 40° C. at various pHs, and at room temperature with average or intense light.

Samples used for the 75° C. study were placed in a dark oven and the absorbance was measured over a period of 48 hours. Test intervals varied with the sample.

Samples used for the 40° C. study were placed in a dark oven and the absorbance was measured over a period of 7 days. Test intervals varied with the sample.

Samples used for the room temperature/average light study were placed in a laboratory hood with the light left on. The absorbance was measured over a period of 9 to 14 days. Test intervals varied with the sample.

Samples used for the room temperature/intense light study were placed in an aluminum foil lined box 6 inches from a fluorescent lamp. The absorbance was measured over a period of 7 days. Test intervals varied with the sample.

Samples used in the pH=2 study were placed in a dark 40° C. oven. The absorbance was measured over a period of 13 days. Test intervals varied with the sample.

Samples used in the pH=4 study were placed in a 40° C. dark oven. The absorbance was measured over a period of 5 days. Test intervals varied with the sample.

The change in stability of the natural colorants is reported as the difference in the rate of color loss between the copigmented sample and the control, without copigment. The rate of color loss is defined by the slope of the least squares regression of the log of the percent of color remaining. The percent remaining is defined in the following equation:

$$\% \text{ absorbance remaining} = (ABS_{tx}/ABS_{t0}) \times 100$$

Where:

$ABS_{t0}$ = the absorbance at time zero $ABS_{tx}$ = the absorbance at a given time x The loss of absorbance or color with time follows first order kinetics and the log of the % absorbance remaining is regressed to produce a straight line. The difference between the slope of the copigmented sample vs the non-copigment sample divided by the slope of the non-copigmented sample is the percent change in stability. A negative percent change indicates a decrease in the rate of color loss.

The results are set forth in Tables XI through XIV.

TABLE XI

GRAPESKIN STABILITY TESTS

| pH | Temperature | Light | Conc. | % Change |
|---|---|---|---|---|
| 3 | 75 | none | 1000 | −32.3 |
| 3 | 75 | none | 500 | −22.0 |
| 3 | 75 | none | 250 | −14.8 |
| 3 | 75 | none | 100 | −8.0 |
| 3 | 40 | none | 1000 | −25.3 |
| 3 | 40 | none | 500 | −24.0 |
| 3 | 40 | none | 250 | −0.6 |
| 3 | 40 | none | 100 | −17.4 |
| 3 | RT | average | 1000 | −37.9 |
| 3 | RT | average | 500 | −12.4 |
| 3 | RT | average | 250 | −4.7 |
| 3 | RT | average | 100 | −5.1 |
| 3 | RT | intense | 1000 | −44.8 |
| 3 | RT | intense | 500 | −6.7 |
| 3 | RT | intense | 250 | −24.7 |
| 3 | RT | intense | 100 | −19.1 |
| 4 | 40 | none | 1000 | −12.7 |
| 2 | 40 | none | 1000 | −29.5 |

TABLE XII

HIBISCUS STABILITY TESTS

| pH | Temperature | Light | Conc. | % Change |
|---|---|---|---|---|
| 3 | 75 | none | 1000 | −3.4 |
| 3 | 75 | none | 500 | −17.3 |
| 3 | 75 | none | 250 | −14.8 |
| 3 | 75 | none | 100 | −9.0 |
| 3 | 40 | none | 1000 | −24.3 |
| 3 | 40 | none | 500 | −22.4 |
| 3 | 40 | none | 250 | −19.8 |

TABLE XII-continued

HIBISCUS STABILITY TESTS

| pH | Temperature | Light | Conc. | % Change |
|---|---|---|---|---|
| 3 | 40 | none | 100 | -15.3 |
| 3 | RT | average | 1000 | -47.7 |
| 3 | RT | average | 500 | -42.2 |
| 3 | RT | average | 250 | -30.4 |
| 3 | RT | average | 100 | -25.6 |
| 3 | RT | intense | 1000 | -48.5 |
| 3 | RT | intense | 500 | -26.7 |
| 3 | RT | intense | 250 | -18.1 |
| 3 | RT | intense | 100 | -8.5 |
| 4 | 40 | none | 1000 | -56.7 |
| 2 | 40 | none | 1000 | -25.6 |

TABLE XIII

ELDERBERRY STABILITY TESTS

| pH | Temperature | Light | Conc. | % Change |
|---|---|---|---|---|
| 3 | 75 | none | 1000 | -5.4 |
| 3 | 75 | none | 500 | -4.7 |
| 3 | 75 | none | 250 | -2.6 |
| 3 | 75 | none | 100 | -10.2 |
| 3 | 40 | none | 1000 | -41.0 |
| 3 | 40 | none | 500 | -55.0 |
| 3 | 40 | none | 250 | -27.9 |
| 3 | 40 | none | 100 | -20.9 |
| 3 | RT | average | 1000 | -43.6 |
| 3 | RT | average | 500 | -25.8 |
| 3 | RT | average | 250 | -23.1 |
| 3 | RT | average | 100 | -24.9 |
| 3 | RT | intense | 1000 | -50.7 |
| 3 | RT | intense | 500 | -38.5 |
| 3 | RT | intense | 250 | -10.5 |
| 3 | RT | intense | 100 | -34.7 |
| 4 | 40 | none | 1000 | -7.6 |
| 2 | 40 | none | 1000 | -14.1 |

TABLE XIV

RED CABBAGE STABILITY TESTS

| pH | Temperature | Light | Conc. | % Change |
|---|---|---|---|---|
| 3 | 75 | none | 1000 | 17.1 |
| 3 | 75 | none | 500 | 2.4 |
| 3 | 75 | none | 250 | 5.6 |
| 3 | 75 | none | 100 | 0.9 |
| 3 | 40 | none | 1000 | -27.8 |
| 3 | 40 | none | 500 | -17.6 |
| 3 | 40 | none | 250 | -14.0 |
| 3 | 40 | none | 100 | -10.4 |
| 3 | RT | average | 1000 | -52.2 |
| 3 | RT | average | 500 | -36.0 |
| 3 | RT | average | 250 | -43.6 |
| 3 | RT | average | 100 | -30.7 |
| 3 | RT | intense | 1000 | -55.9 |
| 3 | RT | intense | 500 | -42.8 |
| 3 | RT | intense | 250 | -62.8 |
| 3 | RT | intense | 100 | -39.3 |
| 4 | 40 | none | 1000 | -8.3 |
| 2 | 40 | none | 1000 | 13.6 |

The results show that WSRE also improved the stability of the pigments. The effect varies with concentration, but not in a linear fashion. The improved stability also varies with the pigments themselves. Grapeskin was significantly protected with WSRE at 75° C., while modest improvements were seen in the stabilization of hibiscus and elderberry. The addition of WSRE produced a negative effect on the stability of red cabbage at this temperature. Both red cabbage and elderberry are known to be more heat stable than other anthocyanin-based pigments; therefore, these pigments may not need a pigment enhancer at high temperatures.

All four pigments showed remarkable increases in stability at 40° C. with addition of WSRE even at as low a concentration as 100 ppm. Many anthocyanins, including red cabbage and elderberry, are prone to light degradation. At room temperature with either average or intense lighting conditions, the rate of color loss due to light degradation of both these colorants was decreased by up to 50%. Similar results were also seen with hibiscus and grapeskin, although not as dramatic.

The effect of WSRE at different pH's also varies. Improvements in stability was evident at pH, 2, 3 and 4 for grapeskin, hibiscus and elderberry, while pH 2 and 4 resulted in negative effects for red cabbage.

Example 9

Tests were also performed on the effect of pigment-improving agents on the anthocyanin stability of cranberry, strawberry, raspberry, and blackberry juices prepared as described in Example 3. Two sets of samples were prepared for each juice. One set was placed in a dark 40° C. oven and the absorbance was measured over a period of 13 days. Samples were filtered with a 0.45 $\mu$m filter prior to every measurement. The other set was placed in a aluminum foil lined box 6 inches from a fluorescent lamp. The absorbance was measured over a period of 13 days. A negative percent change indicates a decrease in the rate of color loss.

The results are shown in Table XV.

TABLE XV

FRUIT JUICE STABILITY RESULTS

| Fruit Juice | pH | Temperature | Light | % Change |
|---|---|---|---|---|
| Blackberry | 3 | 40 | none | -0.7 |
| Blackberry | 3 | RT | intense | 58.7 |
| Cranberry | 3 | 40 | none | 4.7 |
| Cranberry | 3 | RT | intense | 46.8 |
| Raspberry | 3 | 40 | none | 37.4 |
| Raspberry | 3 | RT | intense | 39.6 |
| Strawberry | 3 | 40 | none | -17.1 |
| Strawberry | 3 | RT | intense | -20.1 |

The results clearly show that the anthocyanin pigments found in strawberries are protected from both heat and light degradation.

The description and examples set forth herein are intended to illustrate representative embodiments of the invention. The claims which follow are not intended to be limited to the specific disclosed embodiments. The invention is susceptible to modifications, variations and changes including, without limitation, those known to one of ordinary skill in the art without departing from the proper scope or fair meaning of the following claims.

What is claimed is:

1. An improved pigment composition comprising an anthocyanin pigment and an effective amount of a pigment-improving agent comprising a flavonoid glycuronide or a flavonoid glucuronide.

2. The improved pigment composition of claim 1, wherein said pigment-improving agent is a flavonoid glycuronide.

3. The improved pigment composition of claim 1, wherein said pigment-improving agent is a flavonoid glucuronide.

4. The improved pigment composition of claim 3, wherein said flavonoid glucuronide is selected from the group consisting of luteolin 7-glucuronide; luteolin 3'-glucuronide;

luteolin 7-diglucuronide; luteolin 7-glucuronide-3'-ferulyglucoside; apigenin 7-glucuronide; quercetin 3-(isoferulylglucuronide); 7-sulfatoglucuronides of tricin and luteolin; 3-glucuronide-7-sulfate of kaempferol, quercetin, or isorhamnetin; quercetin 3-glucuronide-3'-sulfate; gossypetin 8-glucuronide-3-sulfate; rhamnetin 3'-glucuronide-3,5,4'-trisulfate; the 7-glucuronide and 8-glucuronide of 5,7,8-trihydroxyflavone (norwogonin), 5,7,2'-trihydroxyflavone 7-glucuronide; apigenin 7-rhamnosyl-(1→2)-galacturonide; apigenin 7-digalacturonide; apigenin 7-galacturonylglucoside; apigenin 7-sulfatoglucuronide; 5,6,7,2'-tetrahydroxyflavone 7-glucuronide; 5,7,2'-trihydroxy-8-methoxyflavone 7-glucuronide; 5,7-dihydroxy-8,2'-dimethoxyflavone 7-glucuronide; luteolin 7-galacturonide-4'-glucoside; 8-hydroxyluteolin 4'-methyl ether 8-glucuronide; tricetin 7,3'-diglucuronide; tricetin 3'-methyl ether 7,5'-diglucuronide; apometzgerin 7-glucuronide; 8 hydroxytricetin 7-glucuronide; kaempferol 3-rhamnoside-7-galacturonide; kaempferol 3-glucoside-7-glucuronide; eupafolin 3-glucuronide; herbacetin 3-glucuronide-8-glucoside; quercetin 3-glucoside-7-glucuronide; quercetin 3-gentiobioside- 7-glucuronide; quercetin 3-glucuronide-3'-sulfate; tamarixetin 5-glucoside-7-glucuronide; quercetin 3',4'-dimethyl ether 5-glucoside-7-glucuronide; gossypetin 3-glucoside-8-glucuronide; and gossypetin 3-glucuronide-8-glucoside.

5. The improved pigment composition of claim 3, wherein said flavonoid glucuronide is luteolin 3'-O-β-glucuronide, luteolin 7-O-β-glucuronide, luteolin 7-O-β-glucuronosyl-(1→2)]-glucuronoside, and apigenin 7-O-β-glucuronide.

6. The improved pigment composition of claim 3, wherein said pigment-improving agent is derived from a food and/or a GRAS substance.

7. The improved pigment composition of claim 1, wherein said pigment-improving agent comprises a water-soluble plant extract.

8. The improved pigment composition of claim 7, wherein said water-soluble plant extract is obtained from a plant in the Labiatae family.

9. The improved pigment composition of claim 8, wherein said water-soluble plant extract is a water-soluble extract of rosemary.

10. The improved pigment composition of claim 8, wherein said water-soluble plant extract is obtained from sage.

11. The improved pigment of claim 8, wherein said water-soluble plant extract is obtained from mint.

12. A method for increasing the intensity or hue of an anthocyanin pigment comprising applying an effective amount of a pigment-improving agent comprising a flavonoid glycoside, wherein said pigment-improving agent also improves the stability of the anthocyanin pigment.

13. The method of claim 12, wherein said pigment-improving agent is a flavonoid glycoside selected from the group consisting of flavonoid glycuronides, flavonoid glucuronides, and caffeic acid derivatives.

14. The method of claim 13, wherein said pigment-improving agent is a flavonoid glycuronide.

15. The method of claim 13, wherein said pigment-improving agent is a flavonoid glucuronide.

16. The method of claim 15, wherein said pigment-improving agent is a caffeic acid derivative.

17. The method of claim 14, wherein said flavonoid glucuronide is selected from the group consisting of luteolin 7-glucuronide; luteolin 3'-glucuronide; luteolin 7-diglucuronide; luteolin 7-glucuronide-3'-ferulyglucoside; apigenin 7-glucuronide; quercetin 3-(isoferulylglucuronide); 7-sulfatoglucuronides of tricin and luteolin; 3-glucuronide-7-sulfate of kaempferol, quercetin, or isorhamnetin; quercetin 3-glucuronide-3'-sulfate; gossypetin 8-glucuronide-3-sulfate; rhamnetin 3'-glucuronide-3,5,4'-trisulfate; the 7-glucuronide and 8-glucuronide of 5,7,8-trihydroxyflavone (norwogonin), 5,7,2'-trihydroxyflavone 7-glucuronide; apigenin 7-rhamnosyl-(1→2)-galacturonide; apigenin 7-digalacturonide; apigenin 7-galacturonylglucoside; apigenin 7-sulfatoglucuronide; 5,6,7,2'-tetrahydroxyflavone 7-glucuronide; 5,7,2'-trihydroxy-8-methoxyflavone 7-glucuronide; 5,7-dihydroxy-8,2'-dimethoxyflavone 7-glucuronide; luteolin 7-galacturonide-4'-glucoside; 8-hydroxyluteolin 4'-methyl ether 8-glucuronide; tricetin 7,3'-diglucuronide; tricetin 3'-methyl ether 7,5'-diglucuronide; apometzgerin 7-glucuronide; 8 hydroxytricetin 7-glucuronide; kaempferol 3-rhamnoside-7-galacturonide; kaempferol 3-glucoside-7-glucuronide; eupafolin 3-glucuronide; herbacetin 3-glucuronide-8-glucoside; quercetin 3-glucoside-7-glucuronide; quercetin 3-gentiobioside-7-glucuronide; quercetin 3-glucuronide-3'-sulfate; tamarixetin 5-glucoside-7-glucuronide; quercetin 3',4'-dimethyl ether 5-glucoside-7-glucuronide; gossypetin 3-glucoside-8-glucuronide; and gossypetin 3-glucuronide-8-glucoside.

18. The method of claim 15, wherein said flavonoid glucuronide is luteolin 3'-O-β-glucuronide, luteolin 7-O-β-glucuronide, luteolin 7-O-β-(glucuronosyl-(1→2))-glucuronoside, and apigenin 7-O-β-glucuronide.

19. The method of claim 15, wherein said pigment-improving agent is derived from a food and/or a GRAS substance.

20. The method of claim 16, wherein said caffeic acid derivative is derived from at least one member of the Labiatae family.

21. The method of claim 16, wherein said caffeic acid derivative is rosmarinic acid.

22. The method of claim 13, wherein said pigment-improving agent further comprises a water-soluble plant extract.

23. The method of claim 22, wherein said water-soluble plant extract is obtained from a plant in the Labiatae family.

24. The method of claim 23, wherein said water-soluble plant extract is a water-soluble extract of rosemary.

25. The method of claim 23, wherein said water-soluble plant extract is obtained from sage.

26. The method of claim 23, wherein said water-soluble plant extract is obtained from mint.

\* \* \* \* \*